(12) United States Patent
Carmel et al.

(10) Patent No.: US 7,406,462 B2
(45) Date of Patent: Jul. 29, 2008

(54) PREDICTION OF QUERY DIFFICULTY FOR A GENERIC SEARCH ENGINE

(75) Inventors: David Carmel, Haifa (IL); Lawrence Adam Darlow, Haifa (IL); Shai Fine, Raanana (IL); Elad Yom-Tov, Mizpe Hoshaya (IL)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 10/968,692

(22) Filed: Oct. 19, 2004

(65) Prior Publication Data

US 2006/0085399 A1 Apr. 20, 2006

(51) Int. Cl.
*G06F 17/30* (2006.01)
(52) U.S. Cl. .............................. 707/3; 707/2
(58) Field of Classification Search ...... 707/3, 707/5, 2
See application file for complete search history.

(56) References Cited

U.S. PATENT DOCUMENTS 6,760,720 B1 * 7/2004 De Bellis ................. 707/3
2001/0002132 A1 * 5/2001 Lee et al. ............... 345/431
2002/0152199 A1 * 10/2002 Teng et al. ............... 707/3
2003/0014405 A1 * 1/2003 Shapiro et al. ............ 707/5
2003/0028520 A1 * 2/2003 Alpha ..................... 707/2
2004/0049478 A1 * 3/2004 Jasper et al. ............. 707/1
2004/0064447 A1 * 4/2004 Simske et al. ............ 707/5
2004/0083084 A1 * 4/2004 West ..................... 703/11
2004/0260692 A1 * 12/2004 Brill et al. ............... 707/5
2006/0031195 A1 * 2/2006 Patterson ................. 707/3

OTHER PUBLICATIONS

G. Amati and C. Carpineto and G. Romano (2004) "Query difficulty, robustness and selective application of query expansion", Proceedings of the 25th European Conference on Information Retrieval (ECIR 2004), Sunderland, Great Britain, pp. 127-137.
Cronen-Townsend, S., Zhou, Y. and Croft, W.B., "Predicting Query Performance," Proceedings of SIGIR 2002, Tampere, Finland, Aug. 11-15, 2002, pp. 299-306.

* cited by examiner

*Primary Examiner*—Khanh B. Pham
*Assistant Examiner*—Amy Ng

(57) ABSTRACT

A query difficulty prediction unit includes a query difficulty predictor to determine the extent of overlap between query documents received from a search engine operating on an input query and sub-query documents received from the search engine operating on sub-queries of the input query. The unit generates a query difficulty prediction from the extent of overlap.

30 Claims, 9 Drawing Sheets

FIG.1

| | | | | | | | |
|---|---|---|---|---|---|---|---|
| FULL QUERY: "MAGNETIC LEVITATION MAGLEV" | 77002 | 39741 | 76311 | 35273 | 87941 | 33402 | 47457 | 1013 | 22953 | 17382 |
| SUB-QUERY 1: MAGNETIC | | 6794 | 50129 | //39741// | //1013// | 43506 | 69131 | 9273 | //47457// | 77266 | 17948 |
| SUB-QUERY 2: LEVITATION | | //47457// | 47947 | //39741// | 89657 | //35273// | //77402// | 69775 | //77002// | 87941 | 28369 |
| SUB-QUERY 3: MAGLEV | | 77003 | 35274 | 75402 | 45525 | 17881 | 70077 | 1010 | 24524 | 71172 | 76499 |
| SUB-QUERY 4: LEVITATION MAGNETIC | | //39741// //77002// //47457// | 30123 | //87941// | 16481 | 60688 | 89657 | 20896 | 22162 |
| SUB-QUERY 5: LEVITATION MAGLEV | | 67036 | 9391 | //39741// | 94709 | //76311// //47457// //35273// | //61496// //77002// |
| SUB-QUERY 6: MAGNETIC MAGLEV | | 12944 | //1013// | 26549 | 89657 | //39741// //35273// | 77266 | 6123 | 33402 | 84398 |

| 3 | 4 | 0 | 4 | 6 | 3 |
|---|---|---|---|---|---|

PREDICTION OF QUERY DIFFICULTY FOR A GENERIC SEARCH ENGINE

FIELD OF THE INVENTION

The present invention relates to search engines generally and to query prediction for search engines in particular.

BACKGROUND OF THE INVENTION

Most computer search engines respond to user queries by generating a list of documents (the "query documents") deemed relevant to the query. Document relevancy is determined by measuring the similarity of the retrieved query documents to the query, usually by estimating the similarity between the words in the document and the keywords of the query. The "keywords" usually are the words of the query excluding prepositions, articles, etc.

Figure 1:
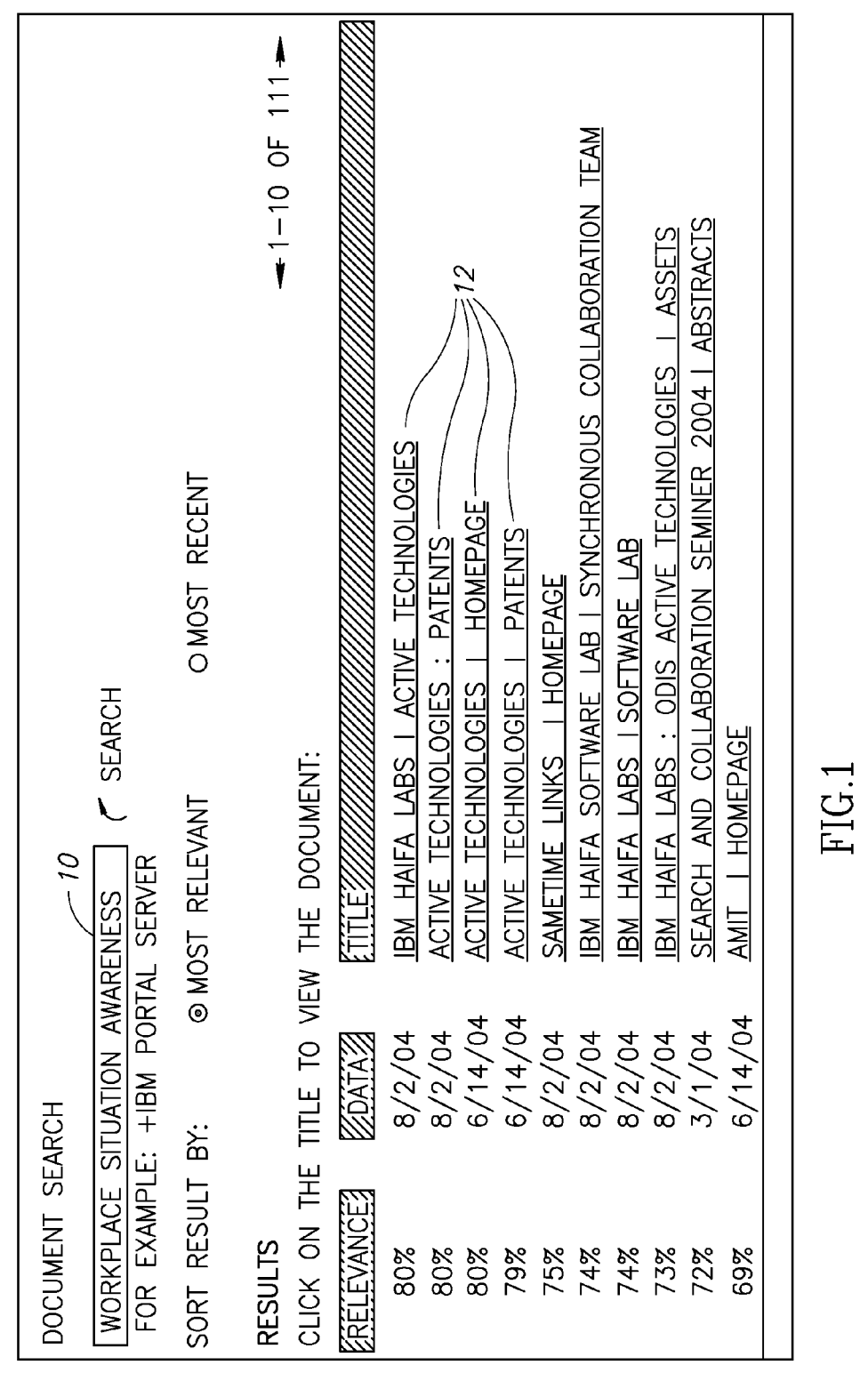

FIG. 1 shows a search query 10, for "workplace situation awareness" and a list of 10 query documents 12. Each query document 12 is listed by its title, a date for the document and the relevancy of the document to search query 10. Moreover, query documents 12 are presented in the order of relevancy; the first document is the one with what the search engine determines is the highest relevancy (80%) and the remaining documents are less relevant according to the search engine.

Unfortunately, the search engine's assumption of relevancy is not always correct and the user may determine that few of the top 10 query documents are truly relevant. One measure of this is called "precision at 10" or "P@10" and is the number of documents in the top 10 results that are truly relevant to the query. The P@10 is manually generated by having a specialist on the subject of the query read each document in the collection and mark it as relevant or irrelevant to answering the query.

Another measure of the quality of the search results is the mean average precision (MAP). This is a metric that measures how high the relevant documents were ranked compared to the irrelevant ones. There are several methods to compute the average precision, but all essentially measure the area under a precision versus recall curve, where precision is the precision at N (N varying between 1 and a large number, for example 1000) and recall is the number of documents ranked as better than the Nth relevant document. The book *Modern Information Retrieval* by Ricardo Baeza-Yates and Berthier Ribeiro-Neto, Addision-Wesley, 1999, discusses many of these issues.

Most search engines have difficulty answering certain queries. For example, consider the query "What impact has the Chunnel had on the British economy and/or the life style of the British?" Most search engines will return many irrelevant documents, containing the words 'British', 'life', 'style', 'economy', etc. But the gist of the query, the Chunnel, is usually lost.

There has been a movement to predict the quality of a search results. The following two articles discuss query prediction.

Cronen-Townsend, S., Zhou, Y. and Croft, W. B., ."Predicting Query Performance," *Proceedings of SIGIR* 2002, Tampere, Finland, Aug. 11-15, 2002, pp. 299-306.

Giambattista Amati, Claudjo Carpineto, and Giovanni Romano "Query Difficulty, Robustness and Selective Application of Query Expansion", Advances in Information Retrieval, 26th European Conference on IR Research, ECIR 2004, Sunderland, UK, Apr. 5-7, 2004, pp 127-137.

Unfortunately, these articles discuss methods which are tied to particular search engines and thus, are not easily transferable to another search engine.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is an illustration of an exemplary search query and results;

FIG. 4 is a schematic illustration of an exemplary set of query documents received from a search engine from queries designed by the query prediction unit of FIG. 2;

FIG. 7 is a schematic illustration of some of the operations of the training unit of FIG. 6;

Figure 2:
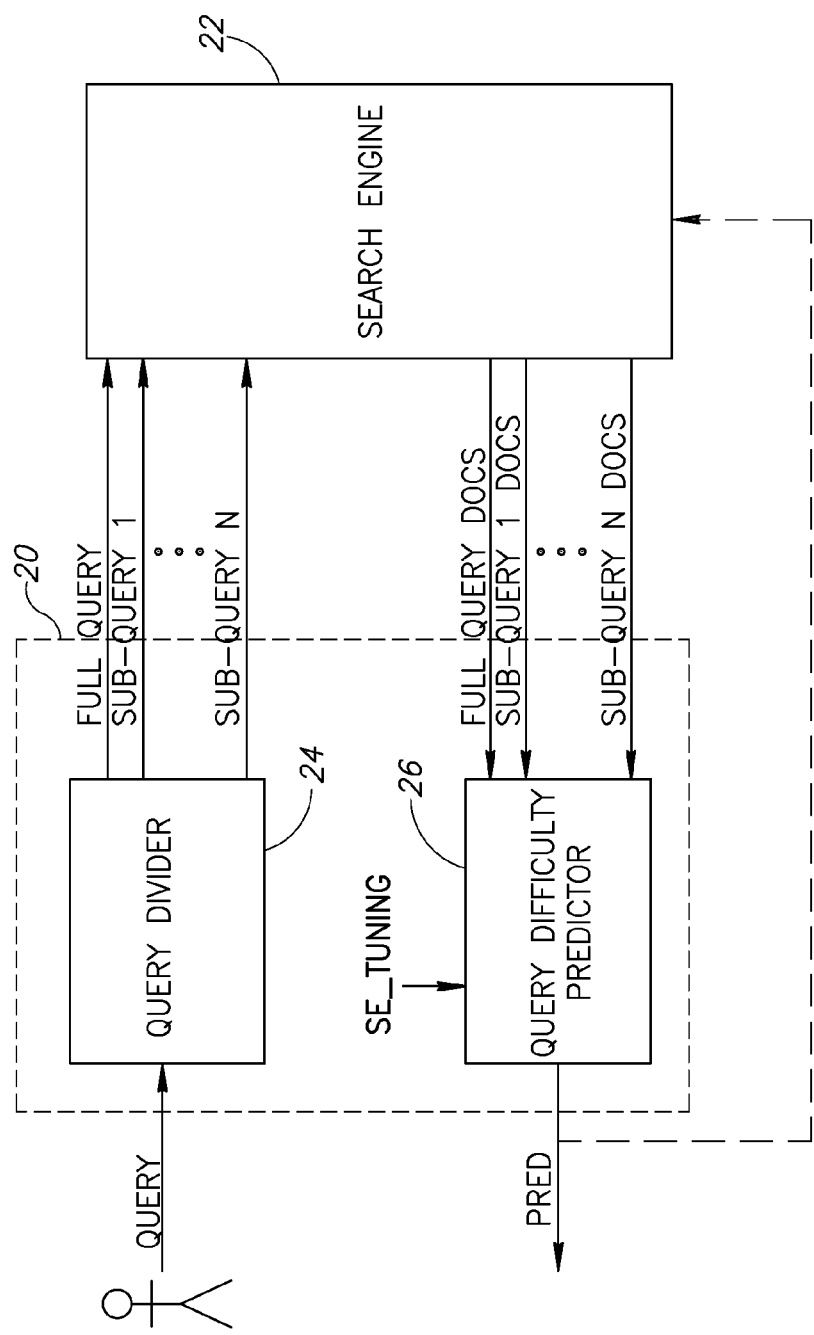
FIG. 2 is a block diagram illustration of a query prediction unit, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have observed that queries that are answered well by search engines are those with keywords and/or sets of keywords, each of which contributes a slightly different number of documents to the final result (say the top X query documents). For such queries, the documents which each keyword(s) contributes to the final result are almost uniformly distributed throughout the final result. Difficult queries (i.e. queries for which the search engine will return mostly irrelevant documents) are those where either all keywords 'agree' on all results or they cannot 'agree' on them. The former occurs where the query contains one rare keyword that is not representative of the whole query and the rest of the query terms appear in many irrelevant documents. This is the case for the exemplary Chunnel query.

Another type of difficult query is one where the query terms do not agree on the target documents and each contributes very few documents to the final results. An example of such a case is the query "Find accounts of selfless heroic acts by individuals or small groups for the benefit of others or a cause". In this query there are no keywords that appear together in the relevant documents and thus the final result set is poor.

Reference is now made to FIG. 2, which illustrates a query prediction unit 20, constructed and operative in accordance with a preferred embodiment of the present invention. Unit 20 may operate with any search engine 22, such as GOOGLE, YAHOO, HOTBOT, JURU, etc, providing it with queries and receiving the query documents. Unit 20 may also operate with a single search engine operating on different databases. In this embodiment, unit 20 may provide queries for each database and may receive the query documents.

Query prediction unit 20 may comprise a query divider 24 and a query difficulty predictor 26. Query divider 24 may divide a user's full query into a multiplicity of sub-queries, where a sub-query may be any suitable keyword and/or set of keywords from among the words of the full query. One exemplary set of keywords might be "lexical affinities" (i.e. closely related pairs of words found in close proximity to each other). Such lexical affinities are described in the article by Yoelle Maarek and Frank Smadja entitled "Full text indexing based on lexical relations: An application: Software libraries," in Proceedings of the Twelfth International ACM SIGIR Conference on Research and Development in Information Retrieval, pages 198-206, Cambridge, Mass., June 1989.

For example, for the full query, "What impact has the Chunnel had on the British economy and/or the life style of the British?", the sub-queries might be the following keywords: "Chunnel", "life", "British", "economy", "impact", "style", and the following lexical affinities: "Chunnel impact", "impact life", "life style", "economy impact", "British style", "British impact", "Chunnel style", "economy style", "British Chunnel", "British life", "economy life", "Chunnel life", "British economy", and "Chunnel economy". In another example, for the full query "Magnetic Levitation Maglev", the keyword sub-queries might be: "Magnetic", "Levitation", and "Maglev" and the lexical affinity sub-queries might be: "levitation magnetic", "levitation maglev" and "magnetic maglev".

Query divider 24 may follow any suitable rules for generating the sub-queries. For example, query divider 24 may find keywords and lexical affinities, using standard rules for such. For example, the keyword may be the words of the query excluding prepositions, articles, etc and the lexical affinities may be pairs of words found in close proximity to each other, where, for example, "close" may be defined as "within 5 words".

Alternatively or in addition, query divider 24 may generate the sub-queries using additional information. For example, query divider 24 may utilize an external dictionary to find other keywords or to find synonyms. In another embodiment, query divider 24 may first perform query expansion (a standard way of improving queries that is discussed in the book *Modern Information Retrieval*) and then may divide the expanded query into sub-queries.

Query divider 24 may provide the full query and the sub-queries (however many there may be), to search engine 22 which, in turn, may generate query documents for each query. Query difficulty predictor 26 may receive the documents and may compare the full query documents (i.e. the documents received in response to the full query) to the sub-query documents (i.e. the documents received in response to the sub-queries). As is described hereinbelow, query difficulty predictor 26 may generate a query difficulty prediction value PRED based on the comparison of the full query documents with the sub-query documents taking into account how successful the particular search engine is in finding relevant documents. In accordance with a preferred embodiment of the present invention, there is a per search engine, tuning weight vector SE_TUNING, described in detail hereinbelow, which is trained on a predetermined set of queries and query documents whose relevance to the query is manually tagged.

It will be appreciated that query prediction unit 20 may be external to search engine 22 and may receive data from search engine 22 in its normal mode of operation (i.e. query execution). As a result, query prediction unit 20 may not be limited to a specific search engine or search method. To switch between search engines may merely require changing vector SE_TUNING.

Query difficulty prediction value PRED may be utilized in many ways. For example, it may be utilized to evaluate query results. It may be provided back to the user, so that s/he may rephrase the full query to improve query prediction.

In another embodiment, prediction value PRED may be provided to search engine 22 which may utilize the value as a target function for optimizing the query. Typically, search engine 22 may optimize a search by adding terms to the query. Such query expansion is known in the art. However, it is also known that query expansion may help "easy" queries but may be detrimental to "hard" queries. The problem has been to determine which is which.

In another embodiment, search engine 22 may utilize prediction value PRED to identify easy queries on which search engine 22 may use query expansion. For example, queries which may need query expansion may be those which have a PRED value above a particular threshold value. For the TREC collection operating with Juru search engine, the threshold value may be 0.65.

Prediction value PRED may also be utilized to select which search engine to use. Given a query and several search engines (e.g. GOOGLE, YAHOO, HOTBOT, etc), query prediction unit 20 may determine which search engine may provide the best results for a given query. To do this, predictor unit 20 may be trained separately for each search engine, thereby to generate per search engine, tuning vector SE_TUNING.

Figure 3:
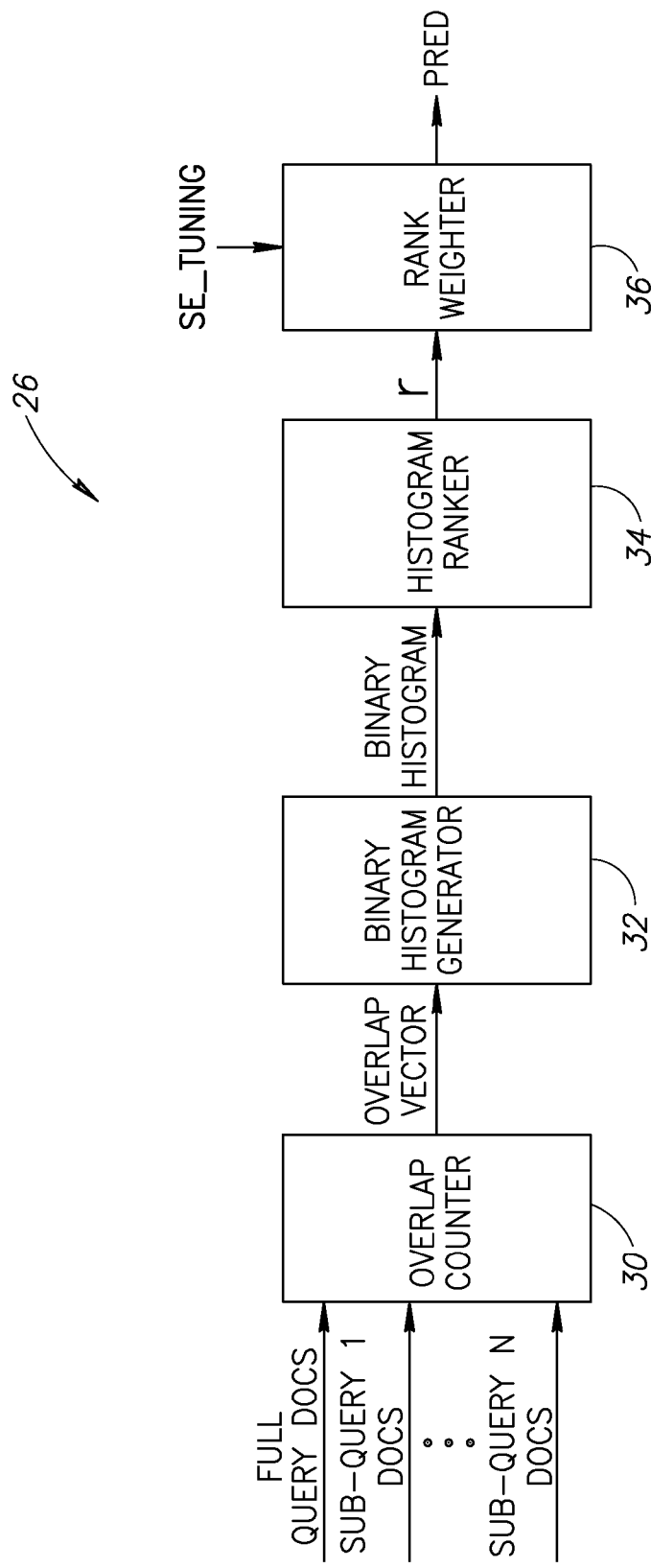
FIG. 3 is a block diagram illustration of the elements of a query difficulty predictor forming part of the query prediction unit of FIG. 2.

Reference is now made to FIG. 3, which illustrates, in block diagram form, the elements of query difficulty predictor 26. Reference is also made to FIG. 4, which illustrates an exemplary set of query documents from search engine 22, and to FIG. 5, which illustrates the operations of query difficulty predictor 26.

As indicated in FIG. 3, query difficulty predictor 26 may comprise an overlap counter 30, a binary histogram generator 32, a histogram ranker 34 and a rank weighter 36. Overlap counter 30 may receive the full query documents and the sub-query documents from search engine 22 and may determine which of the top N documents returned for each sub-query may be found in the top N documents returned for the full query.

For example, FIG. 4 illustrates an exemplary full query "Magnetic Levitation Maglev" and the internal identifier numbers 40 for the top 10 query documents which search engine 22 returned. In addition, FIG. 4 illustrates the following 6 associated sub-queries (sub-queries 1-3 are keyword queries and sub-queries 4-6 are lexical affinity queries):

1. "Magnetic"
2. "Levitation"
3. "Maglev"
4. "levitation magnetic"

5. "levitation maglev" and
6. "magnetic maglev"

For each associated sub-query, FIG. 4 illustrates the internal identifier numbers 42 for the top 10 sub-query documents which search engine 22 returned. As can be seen by considering the identification numbers, some of sub-query identifiers 42 are the same as the query identifiers 40 while many of them are different. FIG. 4 marks the overlapping identifiers (i.e. those sub-query identifiers 42 which are the same as query identifiers 40) with shading. For example, sub-query 1 has three overlapping documents, those whose identifiers are 39741, 1013 and 47457, while sub-query 3 has no overlapping documents.

Figure 5:
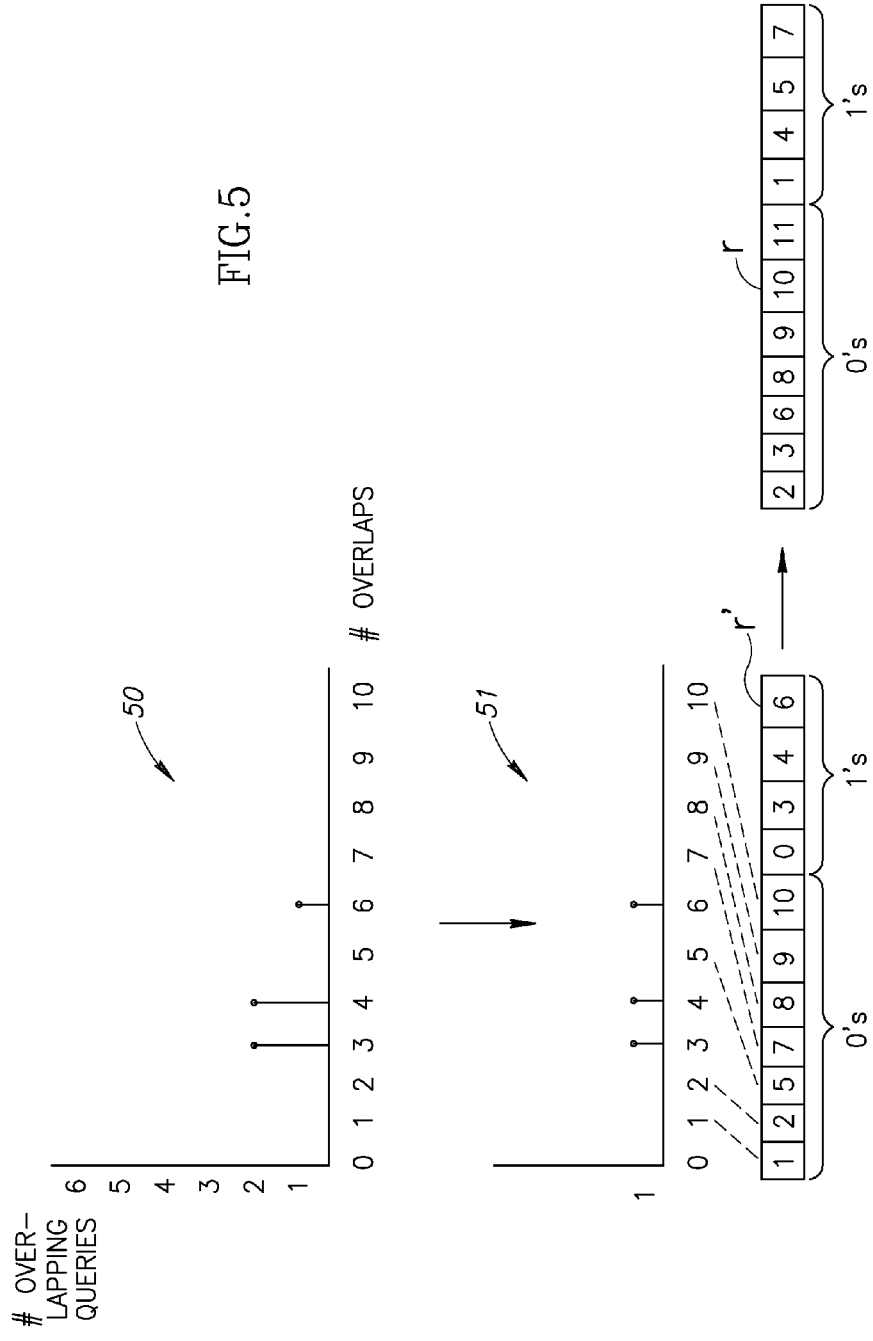
FIG. 5 is a partially graphical, partially schematic illustration of the operations of the query difficulty predictor of FIG. 3.

Overlap counter 30 may count the number of overlapping documents per sub-query. FIG. 4 lists these values in an overlap vector 44 to the right of the document listing. Overlap counter 30 may provide overlap vector 44 to binary histogram generator 32 which may generate a binary histogram therefrom, as shown in FIG. 5.

If desired, generator 32 may first generate a standard histogram 50 listing the number of times X overlaps occurred within overlap vector 44. Thus, in the example of FIG. 4, there was one sub-query with 0 overlaps, two sub-queries with 3 overlaps, two sub-queries with 4 overlaps and one sub-query with 6 overlaps. Generator 32 may then generate a binary histogram 51 from standard histogram 50, where a binary histogram has only two values, 1 or 0. Thus, binary histogram 51 may have a "1" value only at locations 0, 3, 4 and 6 and zero elsewhere. Generator 32 may generate binary histogram 51 directly or from standard histogram 50.

Histogram ranker 34 may generate a ranking vector r from binary histogram 51. Ranking vector r may list the locations of binary histogram 51 which have 1's after those which have 0's, where the first location of ranking vector r is the first location (starting from location 0) to have a 0. This is shown initially in FIG. 4 for a pre-ranking vector r'. Thus, for the example of FIG. 4, the first location with a 0 is location 1. The next locations with 0's are: 2, 5, 7, 8, 9 and 10. After the 0 locations are listed, the locations of 1's are listed. Thus, the next values in pre-ranking vector r' are 0, 3, 4 and 6.

Since ranking vector r is to be used in a vector multiplication operation, it should be shifted by 1 to remove the 0 location value. Thus, all the values in pre-ranking vector r' are increased by 1 to generate ranking vector r. In the example of FIG. 4, ranking vector r is: (2,3,4,8,9,10,11,1,4,5,7). It will be appreciated that histogram ranker 34 may generate ranking vector r directly, if desired.

Rank weighter 36 (FIG. 3) may generate query difficulty prediction value PRED by performing a vector multiplication between ranking vector r and per search engine, tuning vector SE_TUNING as follows:

PRED=SE_TUNING$^T$r

As described hereinabove, query difficulty prediction value PRED may be utilized in many different ways, typically to help improve future queries.

Figure 6:
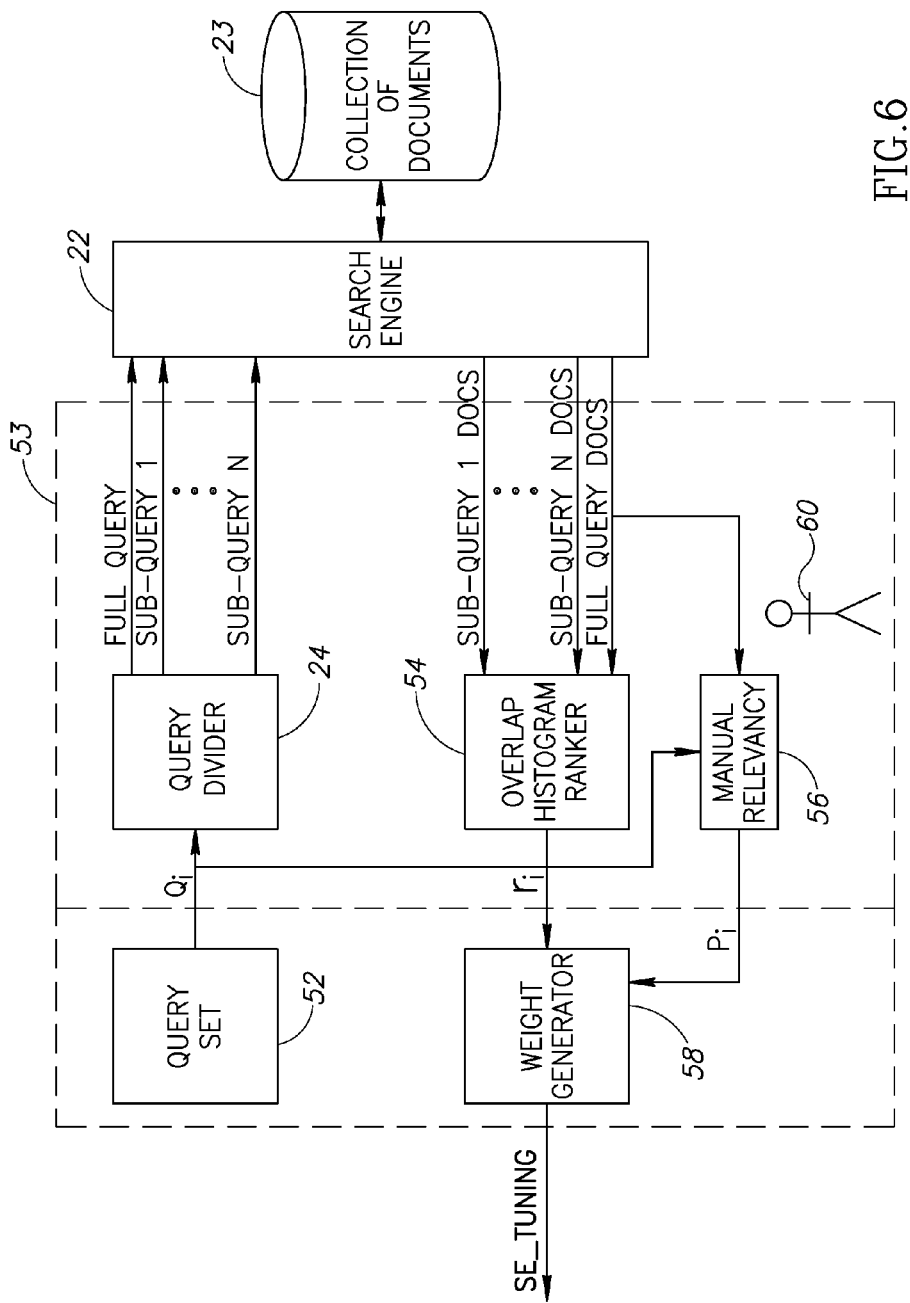
FIG. 6 is a block diagram illustration of a training unit, useful for the query prediction unit of FIG. 2.
Figure 7:
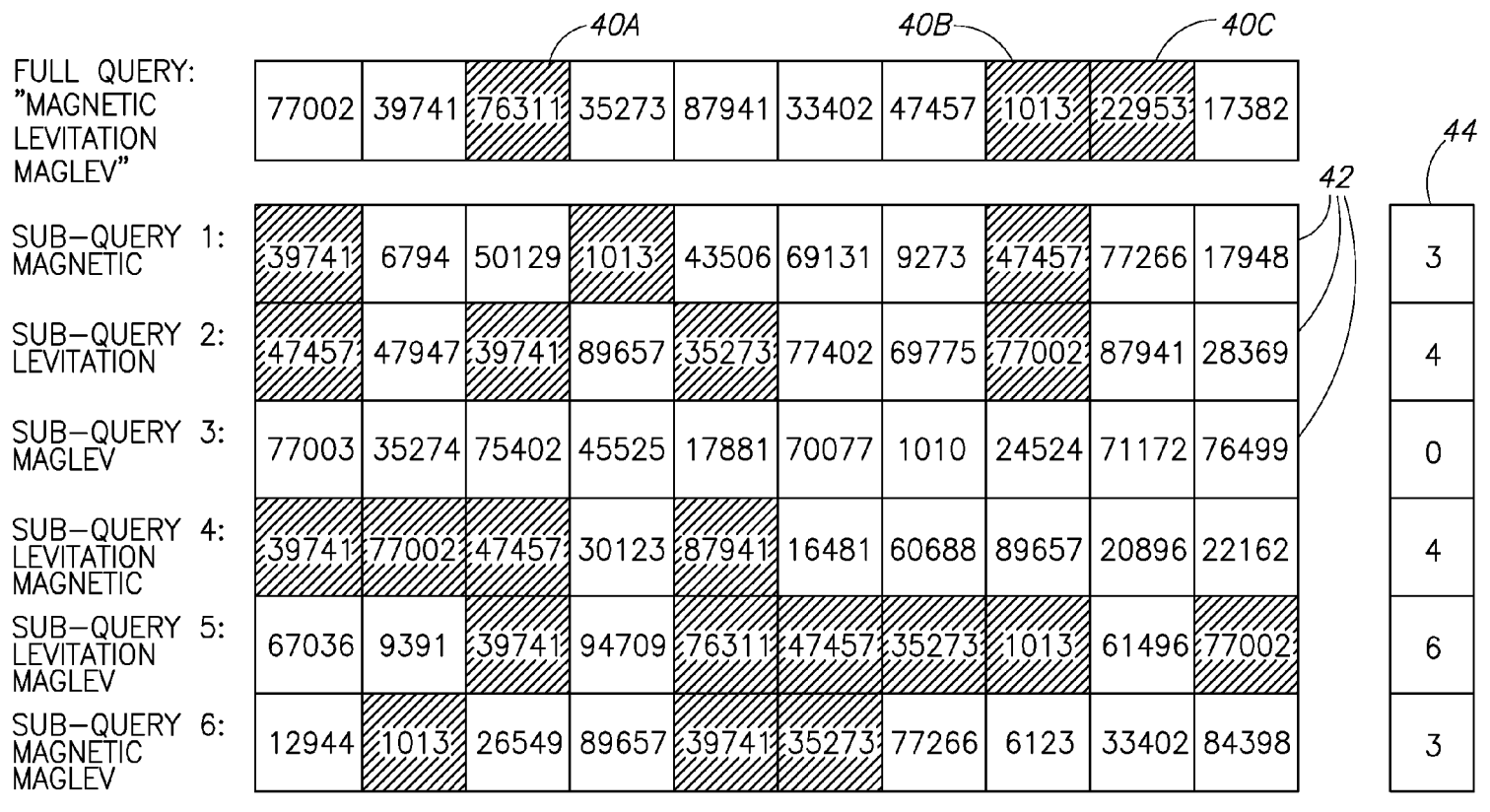

Reference is now made to FIG. 6, which illustrates a training unit 53 to generate tuning vector SE_TUNING and to FIG. 7, which illustrates some of the operations of training unit 53.

Training unit 53 may generate M query rankings ri, such as those described hereinabove, for a predetermined set of M queries Qi, sent to a particular search engine 22. If desired, the queries Qi may also be related to a particular collection 23. Training unit 53 may associate each query ranking ri with a manually determined quality value pi, where pi may be a precision at 10 (P@10) or average precision (AP) value or any other appropriate query quality value. Training unit 53 may then combine the results into vector SE_TUNING for that particular search engine.

Training unit 53 may comprise a query set unit 52, a query divider such as divider 24, an overlap histogram ranker 54, a manual relevancy unit 56 and a weight generator 58. Query set unit 52 may store the predetermined set of queries Qi and may provide them, one at a time, to query divider 24. As described hereinabove, query divider 24 may provide the full query and the sub-queries to the particular search engine 22.

Overlap histogram ranker 54 may receive the full query documents 40 and sub-query documents 42 produced by search engine 22 and may generate a rank vector $r_i$ for them. Overlap histogram ranker 54 may comprise those elements of query difficulty predictor 26 (FIG. 3), such as overlap counter 30, binary histogram generator 32 and histogram ranker 34, used to generate ranking vector r.

Manual relevancy unit 56 may provide a user 60 with full query $Q_i$ and full query documents 40 and may receive an indication from user 60 of the relevancy of query documents 40 to full query $Q_i$. For example, FIG. 7 shows the example of FIG. 4 with three query documents 40A, 40B and 40C marked with shading. User 60 may have indicated that these documents are the only relevant ones in the top 10.

From this indication or others, manual relevancy unit 56 may generate quality value $p_i$, where $p_i$ may be a precision at 10 (P@10) or average precision (AP) value or any other appropriate query quality value. For the example of FIG. 7, the precision at 10 value is 3 and the AP value is 0.23.

Weight generator 58 may receive rankings $r_i$ and query quality values $p_i$ for the M queries $Q_i$ in query set unit 52. Weight generator 58 may then compute vector SE_TUNING, using any suitable method. For example, the computation may be a linear regression, whereby the vector SE_TUNING may be found using a pseudo-inverse computation, such as:

$$SE\_TUNING=(R \cdot R^T)^{-1} Rp$$

where R may be a matrix whose columns are the rankings r of individual queries and p may be a vector containing the quality values of all the queries.

Figure 8:
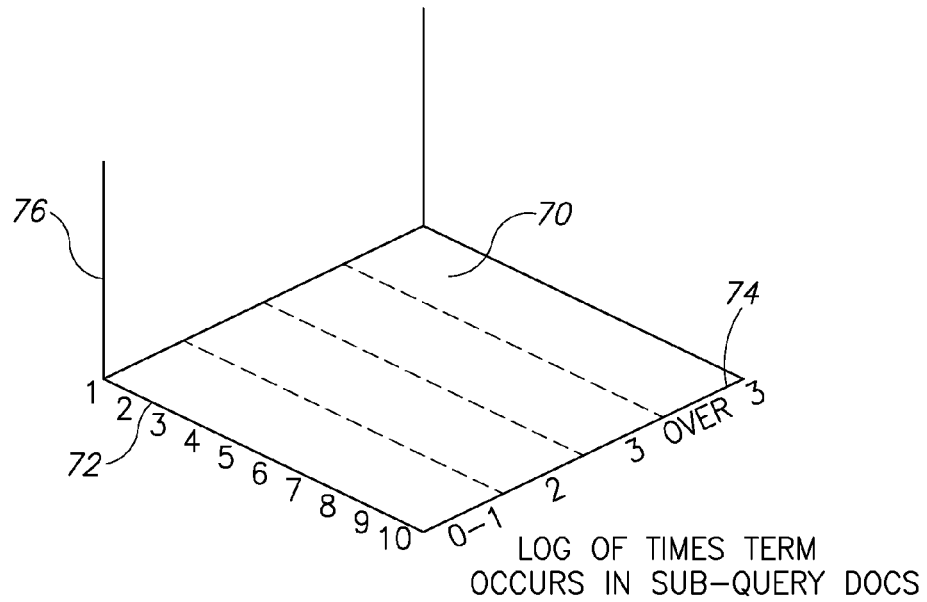
FIG. 8 is a graphical illustration of a two-dimensional histogram, useful in an alternative embodiment of the present invention.

In an alternative embodiment of the present invention, query difficulty predictor 26 and overlap histogram ranker 54 may utilize a two-dimensional histogram 70, such as that shown in FIG. 8 to which reference is now made. 2D histogram 70 may utilize a further standard output of search engine 22, that is, the number of documents in the index in which a term, such as a sub-query term, appears.

2D histogram 70 may have a first axis 72 which may mark the number of overlaps and a second axis 74 which may mark the logarithm of the number T of times the term in the sub-query appears in the database, rounded to the nearest integer (If it appears zero times, then this number may be set to zero). The vertical axis, marked 76, may be the histogram values.

Alternatively, and as shown in FIG. 8, second axis 74 may mark the integers 0 and 1 in the first cell, the integer 2 in the second cell, the integer 3 in the third cell, and any number above 3 in the fourth cell.

Binary histogram generator 32 may make 2D histogram 70 into a binary histogram by first concatenating the 11-cell long vectors from along axis 72 one after the other (producing a vector with cells numbered 0 to 43), after which it may convert the vector into a binary vector. Histogram ranker 34 may operate as before as may rank weighter 36 and weight generator 54.

In an alternative embodiment, the linear vector for the histograms may be optimized for either minimum mean square error or, if the relative order of queries is of interest, to their rank using a method described in the following article:

T. Joachims, Optimizing Search Engines Using Clickthrough Data, Proceedings of the ACM Conference on Knowledge Discovery and Data Mining (KDD), ACM, 2002.

Figure 9:
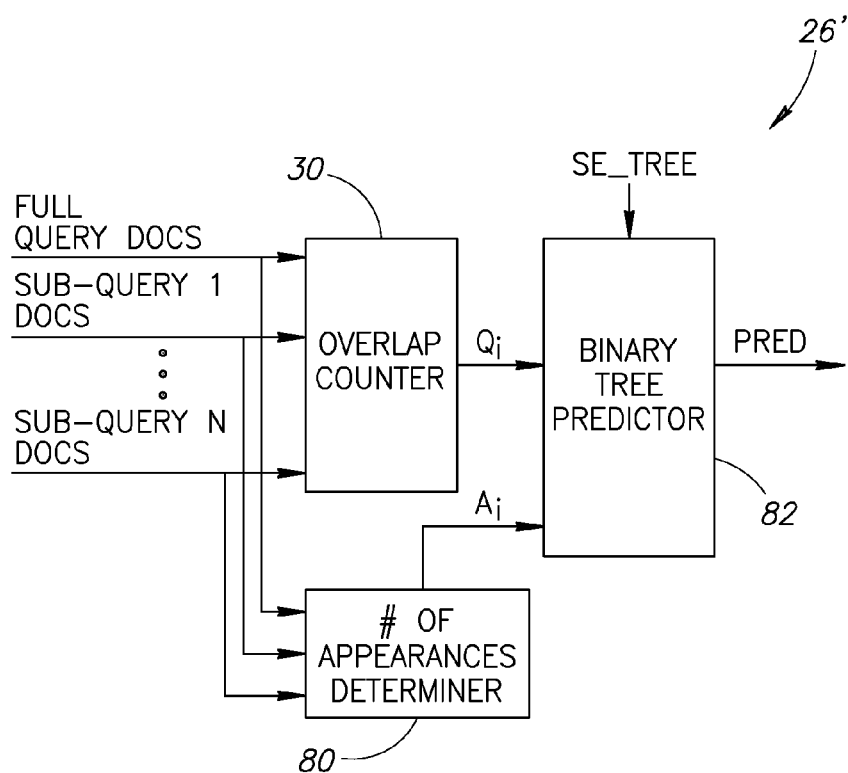
FIG. 9 is a block diagram illustration of a further alternative embodiment of the present invention.
Figure 10:
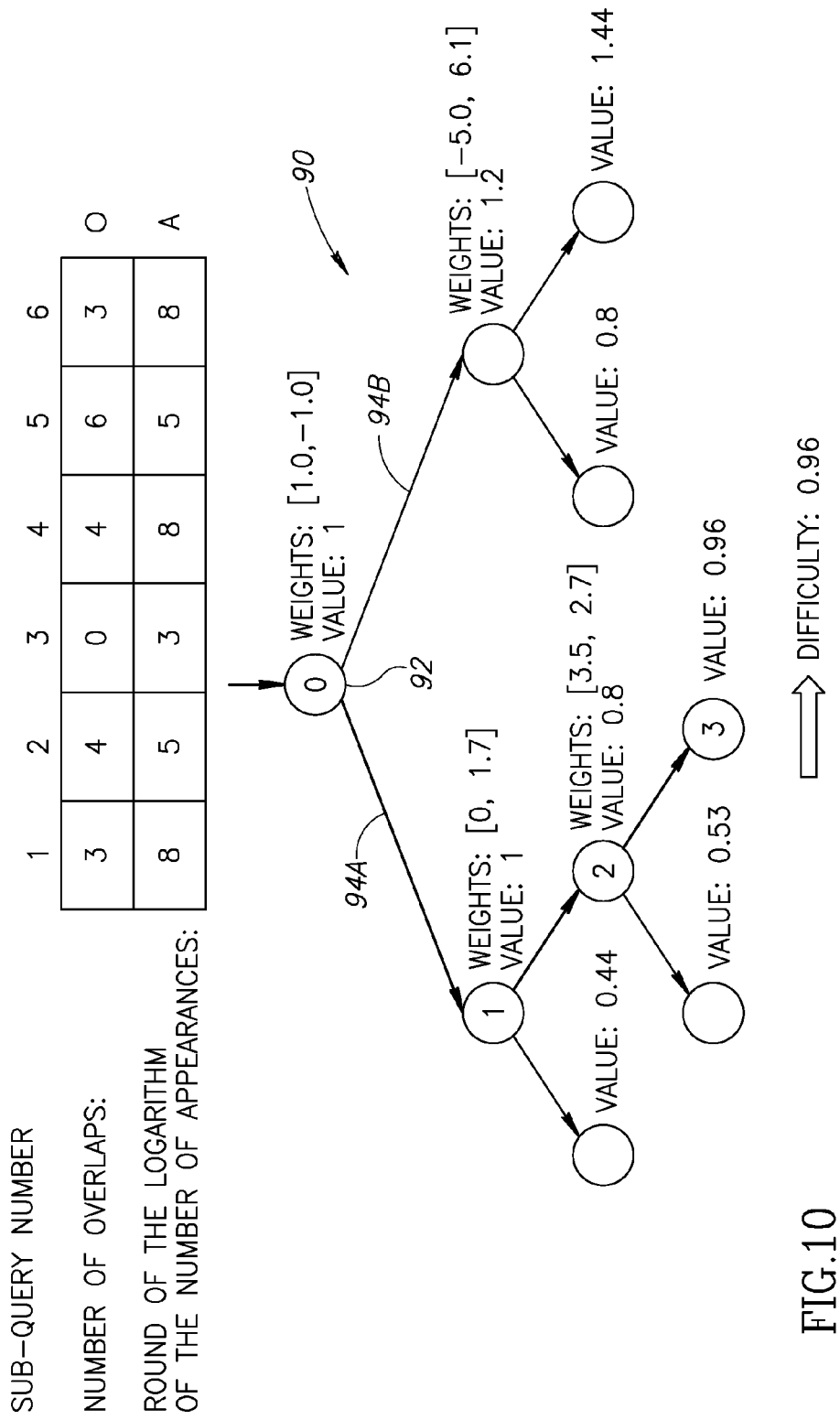
FIG. 10 is a schematic illustration of the operation of the embodiment of FIG. 9.

Reference is now made to FIG. 9, which illustrates an alternative embodiment of the present invention, and to FIG. 10, which is helpful in understanding the operation of the embodiment of FIG. 9.

In this embodiment, the query difficulty predictor, here labeled 26', comprises overlap counter 30, a number of appearances determiner 80 and a binary tree predictor 82. Determiner 80 may generate an appearance logarithm vector A by taking the logarithm of the number T of times the term in the sub-query appears in the database. The number T may be provided by search engine 22.

Binary tree predictor 82 may take overlap vector, here labeled O, from overlap counter 30 and appearance logarithm vector A and, together with a per search engine, set SE_TREE of node variables, may determine query difficulty value PRED. Binary tree predictor 82 may implement a decision tree 90, such as the one shown in FIG. 10, where each node may store a set of two weights $W_O$ and $W_A$ and a prediction value. Weight $W_O$ may be for an element $O_i$ of overlap vector O and weight $W_A$ may be for an element $A_i$ of appearance logarithm vector A. The prediction value may be the value at the node. The values of weights $W_O$ and $W_A$ and of the prediction values of variable SE_TREE may be per search engine and/or per database and may be generated externally with a particular training set, as described in more detail hereinbelow.

Binary tree predictor 82 may begin at a root node 92 of the tree and may move along its branches 94, each time using the information from one sub-query. At step i, binary tree predictor 82 may multiply weight $W_O$ at the current node by ith overlap element $O_i$ and may multiply weight $W_A$ at the current node by ith appearance element $A_i$, and may add the two values to get a result R. Mathematically, this may be written:

$$J = W_O O_i + W_A A_i$$

Binary tree predictor 82 may then take the left branch of tree 90 if the result J is larger than zero and the right branch otherwise. In another embodiment, binary tree predictor 82 may take the left branch of tree 90 if the result J is larger than a threshold $T_i$.

Binary tree predictor 82 may end its operation when no more sub-queries exist or when a terminal node is reached. The prediction of difficulty is the prediction value at the node in which the movement was terminated.

In the example of FIG. 10, for node 0, the values $[O_i, A_i]$ are [3,8] and the weights $[W_O, W_A]$ are [1.0,−1.0]. The result J for node 0 may be −5. Binary tree predictor 82 may then take the left branch, to the node labeled 1. Here, the multiplication is of input [4,5] by weights [0,1.7], resulting in a value of 8.5, which is a positive number. The right branch is taken to the node labeled 2. Here, the multiplication is of input [0,3] by weights [3.5,2.7], resulting in a value of 8.1, which is a positive number. The right branch is taken to the node labeled 3. This is a terminal node having a prediction value of 0.96. Thus, the query difficulty prediction value PRED is 0.96 in this example.

Decision tree 90 may be generated using 200 training queries. The prediction value of a node may be computed during training in any suitable manner. In one exemplary method, the value of a node may be computed in the following manner: The value of the root node (i.e. node 0 of the example of FIG. 10) is 1. The prediction value at a left branch is the prediction value from the previous node divided by 1.5. The prediction value at a right branch is the prediction value from the previous node multiplied by 1.2. The order in which the sub-queries are entered into the tree during classification is unimportant. In one embodiment, they may be entered according to their appearance values, from low to high. A terminal node is one which no more than 4 of the training queries reached.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A query difficulty prediction unit comprising:
   a processor;
   a memory;
   a query divider to divide an input query into a multiplicity of sub-queries and to provide said input query and said multiplicity of sub-queries to a search engine; and
   a query difficulty predictor to generate a query difficulty prediction at least using query documents received from said search engine operating on said input query and said sub-queries, wherein said predictor comprises an overlap counter to generate an overlap vector of the extent of overlap between said query documents for said input query and said query documents for said sub-queries;
   a binary histogram generator to generate a binary histogram of said overlap vector; and
   a linear predictor to multiply a per search engine, tuning vector with a ranked version of said binary histogram to generate said query difficulty prediction.

2. The unit according to claim 1 and wherein said binary histogram is a two-dimensional histogram of said overlap vector and an appearances vector corresponding to the number of times each sub-query term appears in said query documents.

3. The unit according to claim 1 and wherein said predictor comprises:
   an appearances counter to generate an appearances vector corresponding to the number of times each sub-query term appears in said query documents; and
   a binary tree predictor to move through a tree of weights using said overlap vector and said appearances vector to generate said query difficulty prediction.

4. The unit according to claim 1 and wherein said sub-queries are at least one of the following: keywords, lexical affinities, synonyms and dictionary definitions.

5. The unit according to claim 1 and wherein said query divider comprises at least one of the following units:
   a unit to generate keywords from said input query;
   a unit to generate lexical affinities from said input query; and
   query expansion means to generate an expanded query and divider means to generate said sub-queries from said expanded query.

6. The unit according to claim 1 and also comprising means to provide a user with said prediction value.

7. The unit according to claim 1 and also comprising means to provide said search engine with said prediction value.

8. The unit according to claim 1 and also comprising a query expansion decider to utilize said prediction value to determine whether or not to perform query expansion.

9. The unit according to claim 1 and also comprising a search engine selector to utilize said prediction value to select a search engine from a plurality of search engines.

10. The unit according to claim 1 and wherein said search engine comprises multiple databases and wherein said query divider provides said input query and said sub-queries to said search engine multiple times, one for each database.

11. The unit according to claim 1 and wherein said sub-queries are at least one of a keyword and a set of keywords from among the words of said input query.

12. A query difficulty prediction unit comprising:
a processor;
a memory; and
a query difficulty predictor to determine the extent of overlap between query documents received from a search engine operating on an input query and sub-query documents received from said search engine operating on sub-queries of said input query and to generate a query difficulty prediction at least from said extent of overlap; wherein said query difficulty predictor comprises:
a binary histogram generator to generate a binary histogram of an overlap vector of said extent of overlap; and
a linear predictor to multiply a per search engine, tuning vector with a ranked version of said binary histogram to generate said query difficulty prediction.

13. The unit according to claim 12 and wherein said binary histogram is a two-dimensional histogram of said overlap vector and an appearances vector corresponding to the number of times each sub-query term appears in said query documents.

14. The unit according to claim 12 and wherein said query difficulty predictor comprises:
an appearances counter to generate an appearances vector corresponding to the number of times each sub-query term appears in said query documents; and
a binary tree predictor to move through a tree of weights using an overlap vector of said extent of overlap and said appearances vector to generate said query difficulty prediction.

15. The unit according to claim 12 and wherein said sub-queries are at least one of a keyword and a set of keywords from among the words of said input query.

16. A computer program product readable by a machine, storing a program of instructions on a computer storage medium executable by the machine to perform method steps for query difficulty prediction, said method steps comprising:
dividing an input query into a multiplicity of sub-queries;
providing said input query and said multiplicity of sub-queries to a search engine; and
generating a query difficulty prediction at least using query documents received from said search engine operating on said input query and said sub-queries; wherein said generating comprises:
generating an overlap vector of the extent of overlap between said query documents for said input query and said query documents for said sub-queries;
generating a binary histogram of said overlap vector; and
multiplying a per search engine, tuning vector with a ranked version of said binary histogram to generate said query difficulty prediction.

17. The product according to claim 16 and wherein said binary histogram is a two-dimensional histogram of said overlap vector and an appearances vector corresponding to the number of times each sub-query term appears in said query documents.

18. The product according to claim 16 and wherein said generating a query difficulty prediction comprises:
generating an appearances vector corresponding to the number of times each sub-query term appears in said query documents; and
moving through a tree of weights using said overlap vector and said appearances vector to generate said query difficulty prediction.

19. The product according to claim 16 and wherein said sub-queries are at least one of the following: keywords, lexical affinities, synonyms and dictionary definitions.

20. The product according to claim 16 and wherein said dividing comprises at least one of the following steps:
generating keywords from said input query;
generating lexical affinities from said input query; and
generating an expanded query and generating said sub-queries from said expanded query.

21. The product according to claim 16 and also comprising providing a user with said prediction value.

22. The product according to claim 16 and also comprising providing said search engine with said prediction value.

23. The product according to claim 16 and also comprising utilizing said prediction value to determine whether or not to perform query expansion.

24. The product according to claim 16 and also comprising utilizing said prediction value to select a search engine from a plurality of search engines.

25. The product according to claim 16 and wherein said search engine comprises multiple databases and wherein said providing comprises providing said input query and said sub-queries to said search engine multiple times, one for each database.

26. The product according to claim 16 and wherein said sub-queries are at least one of a keyword and a set of keywords from among the words of said input query.

27. A computer program product readable by a machine, storing a program of instructions on a computer storage medium executable by the machine to perform method steps for query difficulty prediction, said method steps comprising:
determining the extent of overlap between query documents received from a search engine operating on an input query and sub-query documents received from said search engine operating on sub-queries of said input query; and generating a query difficulty prediction at least from said extent of overlap; wherein said generating comprises:
generating a binary histogram of an overlap vector of said extent of overlap; and
multiplying a per search engine, tuning vector with a ranked version of said binary histogram to generate said query difficulty prediction.

28. The product according to claim 27 and wherein said binary histogram is a two-dimensional histogram of said overlap vector and an appearances vector corresponding to the number of times each sub-query term appears in said query documents.

29. The product according to claim 27 and wherein said generating a query difficult prediction comprises:
generating an appearances vector corresponding to the number of times each sub-query term appears in said query documents; and
moving through a tree of weights using an overlap vector of said extent of overlap and said appearances vector to generate said query difficulty prediction.

30. The product according to claim 27 and wherein said sub-queries are at least one of a keyword and a set of keywords from among the words of said input query.

* * * * *